US009817885B2

(12) United States Patent
Yang et al.

(10) Patent No.: US 9,817,885 B2
(45) Date of Patent: Nov. 14, 2017

(54) METHOD AND APPARATUS FOR GROUPING NETWORK SERVICE USERS

(71) Applicant: TENCENT TECHNOLOGY (SHENZHEN) COMPANY LIMITED, Shenzhen (CN)

(72) Inventors: Xiangyong Yang, Shenzhen (CN); Zhibing Ai, Shenzhen (CN); Lichun Liu, Shenzhen (CN); Chuan Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 15/395,714

(22) Filed: Dec. 30, 2016

(65) Prior Publication Data
US 2017/0109431 A1  Apr. 20, 2017

Related U.S. Application Data

(63) Continuation of application No. PCT/CN2015/082396, filed on Jun. 25, 2015.

(30) Foreign Application Priority Data

Jun. 30, 2014  (CN) .......................... 2014 1 0307390

(51) Int. Cl.
G06F 17/30 (2006.01)
H04L 29/08 (2006.01)

(52) U.S. Cl.
CPC .. *G06F 17/30598* (2013.01); *G06F 17/30569* (2013.01); *H04L 67/26* (2013.01)

(58) Field of Classification Search
CPC ................................................. G06F 17/30598
See application file for complete search history.

(56) References Cited

U.S. PATENT DOCUMENTS 5,974,396 A * 10/1999 Anderson .............. G06Q 30/02
705/14.25
6,055,573 A * 4/2000 Gardenswartz ........ G06Q 30/02
709/219

(Continued)

FOREIGN PATENT DOCUMENTS

CN 102135983 A 7/2011
CN 103167329 A 6/2013

(Continued)

OTHER PUBLICATIONS

Benevenuto, Fabricio, et al. "Characterizing user behavior in online social networks." Proceedings of the 9th ACM SIGCOMM conference on Internet measurement conference. ACM, 2009.*

(Continued)

*Primary Examiner* — Jimmy H Tran
(74) *Attorney, Agent, or Firm* — Anova Law Group, PLLC

(57) ABSTRACT

A method for grouping network service users includes acquiring attribute and/or behavior data of multiple users within a current period, and converting the attribute and/or behavior data into standardized data; determining multiple group central points according to the standardized data, and placing the standardized data in a group where a group central point having a shortest distance is located; determining group features of groups according to standardized data in the groups; and separately pushing corresponding service push information to users in the groups according to the group features of the groups. In addition, an apparatus for grouping network service users is further described.

20 Claims, 9 Drawing Sheets

(56) References Cited

U.S. PATENT DOCUMENTS

| | | | | | |
|---|---|---|---|---|---|
| 6,714,975 | B1* | 3/2004 | Aggarwal | | G06Q 30/02 |
| | | | | | 705/14.43 |
| 7,069,308 | B2* | 6/2006 | Abrams | | G06Q 10/10 |
| | | | | | 705/319 |
| 7,720,855 | B2* | 5/2010 | Brown | | G06Q 10/10 |
| | | | | | 707/758 |
| 7,797,345 | B1* | 9/2010 | Martino | | G06F 17/30867 |
| | | | | | 707/792 |
| 7,818,392 | B1* | 10/2010 | Martino | | G06Q 10/10 |
| | | | | | 709/200 |
| 7,818,394 | B1* | 10/2010 | Lawler | | G06Q 10/10 |
| | | | | | 709/200 |
| 7,831,684 | B1* | 11/2010 | Lawler | | G06Q 10/10 |
| | | | | | 709/200 |
| 7,844,671 | B1* | 11/2010 | Lawler | | H04L 51/32 |
| | | | | | 709/204 |
| 7,856,449 | B1* | 12/2010 | Martino | | G06F 17/3089 |
| | | | | | 707/781 |
| 8,185,461 | B2* | 5/2012 | Kenedy | | G06Q 40/00 |
| | | | | | 705/35 |
| 8,255,403 | B2* | 8/2012 | Kenedy | | G06F 17/30867 |
| | | | | | 705/26.7 |
| 8,386,519 | B2* | 2/2013 | Kenedy | | G06Q 30/0631 |
| | | | | | 707/784 |
| 8,762,285 | B2* | 6/2014 | Davis | | G06Q 30/02 |
| | | | | | 705/319 |
| 9,031,870 | B2* | 5/2015 | Kenedy | | G06F 17/30867 |
| | | | | | 705/26.7 |
| 9,128,989 | B2* | 9/2015 | Lawler | | G06F 17/3053 |
| 2010/0205541 | A1* | 8/2010 | Rapaport | | G06Q 10/10 |
| | | | | | 715/753 |
| 2010/0268714 | A1* | 10/2010 | Moon | | G06F 17/30572 |
| | | | | | 707/737 |
| 2014/0372875 | A1* | 12/2014 | Sugibuchi | | G06F 17/30713 |
| | | | | | 715/243 |
| 2016/0034561 | A1* | 2/2016 | Sexton | | G06F 17/30598 |
| | | | | | 707/737 |
| 2016/0246871 | A1* | 8/2016 | Singh | | G06F 17/30598 |
| 2017/0004201 | A1* | 1/2017 | Snell | | G06F 17/30598 |

FOREIGN PATENT DOCUMENTS

| | | |
|---|---|---|
| CN | 103198418 A | 7/2013 |
| CN | 103731738 A | 4/2014 |
| CN | 103886047 A | 6/2014 |

OTHER PUBLICATIONS

Brown, Stephen J. "Social network for affecting personal behavior." U.S. Pat. No. 7,720,855. May 18, 2010.*

Aral, Sinan, Lev Muchnik, and Arun Sundararajan. "Distinguishing influence-based contagion from homophily-driven diffusion in dynamic networks."Proceedings of the National Academy of Sciences 106.51 (2009): 21544-21549.*

Maia, Marcelo, Jussara Almeida, and Virgilio Almeida. "Identifying user behavior in online social networks." Proceedings of the 1st workshop on Social network systems. ACM, 2008.*

Sarwar, Badrul, et al. "Item-based collaborative filtering recommendation algorithms." Proceedings of the 10th international conference on World Wide Web. ACM, 2001.*

Balachandran, Anand, et al. "Characterizing user behavior and network performance in a public wireless LAN." ACM SIGMETRICS Performance Evaluation Review. vol. 30. No. 1. ACM, 2002.*

The World Intellectual Property Organization (WIPO) International Search Report for PCT/CN2015/082396 dated Sep. 29, 2015 pp. 1-3.

* cited by examiner

METHOD AND APPARATUS FOR GROUPING NETWORK SERVICE USERS

CROSS REFERENCE

This application claims priority to PCT Application No. PCT/CN2015/082396, filed on Jun. 25, 2015, which claim priority to Chinese Patent Application No. 201410307390.7, filed on Jun. 30, 2014. The content of the two priority applications is hereby incorporated by reference in their entirety.

FIELD OF THE TECHNOLOGY

The present disclosure relates to the field of Internet technologies, and in particular, to a method and an apparatus for grouping network service users.

BACKGROUND OF THE DISCLOSURE

With the development of Internet technologies, network services such as web application software, online games, online information, and on line videos have numerous applications. Various network services have a large number of users, the number of users grows very rapidly, and old users leave and new users come frequently. To further promote network services, carriers often send service promotion information to users, so as to increase the usage of network services and added services thereof by users. However, in an existing information push manner, a manner such as random push or general push is often used, or user groups are formed according to experience of carriers, and different information is pushed to different user groups. However, because the number of users is large, push is random, and users may change their focuses over a period of time. A conventional grouping may not be able to adaptively form user groups, which may result in that promotion of information is unreasonable and is low in efficiency, causing a failure to achieve an objective of information push and also confusions to users.

SUMMARY

Embodiments of the present invention provide a method and an apparatus for grouping network service users, so that users of network services can be grouped in a more precise and reasonable manner.

An embodiment of the present invention proposes a method for grouping network service users, includes acquiring attribute and/or behavior data of multiple users within a current period, the attribute and/or behavior data of each user including multiple statistical indicators, and converting the attribute and/or behavior data into standardized data; determining multiple group central points according to the standardized data, and placing the standardized data in a group where a group central point having a shortest distance is located; determining group features of groups according to standardized data in the groups; and separately pushing service push information of corresponding group features to users in the groups according to the group features of the groups.

An embodiment of the present invention further proposes an apparatus for grouping network service users, includes: a data statistics module, configured to acquire attribute and/or behavior data of multiple users within a current period, the attribute and/or behavior data of each user including multiple statistical indicators; a data conversion module, configured to convert the attribute and/or behavior data into standardized data; a data grouping module, configured to determine multiple group central points according to the standardized data, and place the standardized data in a group where a group central point having a shortest distance is located; a feature determination module, configured to determine group features of groups according to standardized data in the groups; and an information push module, configured to separately push service push information of corresponding group features to users in the groups according to the group features of the groups.

In the embodiments of the present invention, users are grouped in a precise manner according to attribute and/or behavior data of the users, so that formed groups have respective group features, grouping is more accurate, and push of service information is more reasonable.

BRIEF DESCRIPTION OF THE DRAWINGS

The aforementioned features and advantages of the disclosure as well as additional features and advantages thereof will be more clearly understood hereinafter as a result of a detailed description of preferred embodiments when taken in conjunction with the drawings.

The implementation of objectives, functional characteristics, and advantages of the present disclosure are further described with reference to the embodiments and the accompanying drawings.

DESCRIPTION OF EMBODIMENTS

It should be understood that the specific embodiments described herein are only used to explain the present disclosure rather than to limit the present disclosure.

Figure 1:
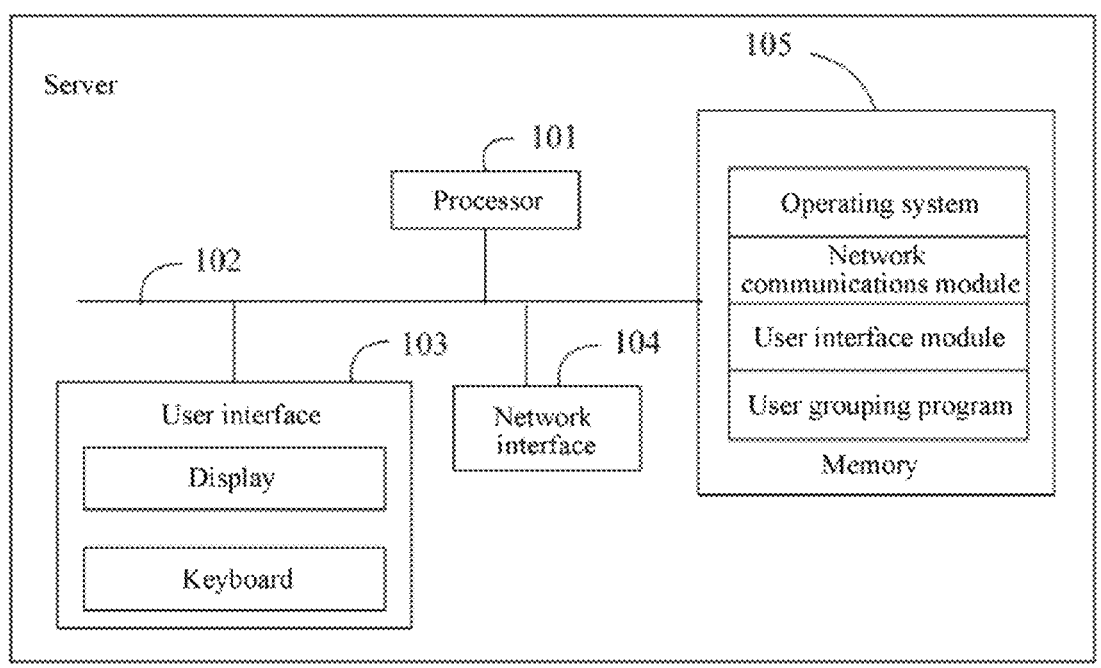
FIG. 1 illustrates a server in which an apparatus for grouping network service users is located in an embodiment of the present invention.

As shown in FIG. 1, FIG. 1 illustrates of a server where an apparatus for grouping network service users is located in an embodiment of the present invention. The server may include: at least one processor 101, for example, a CPU, at least one network interface 104, a user interface 103, a memory 105, and at least one communication bus 102. The communication bus 102 is configured to implement connection and communication between these components. The user interface 103 may include a display or a keyboard, and may further include a standard wired interface or wireless interface. The network interface 104 may include a standard wired interface or wireless interface (for example, WIFI interface). The memory 105 may be a high-speed RAM memory, or may also be a non-volatile memory, for example, at least one disk memory. The memory 105 may further be at least one storage apparatus located far away from the processor 101. The memory 105 that is used as a computer storage medium may include an operating system, a network communications module, a user interface module, and a user grouping program.

In the server where the apparatus for grouping network service users is located shown in FIG. 1, the network interface 104 is mainly configured to connect a terminal device or other servers, and perform data communication with the terminal device or the other servers. The user interface 103 is mainly configured to receive an instruction from a user such as an administrator and a carrier, and interact with the user such as an administrator and a carrier.

The processor 101 may be configured to invoke the user grouping computer programs stored in the memory 105 and execute the following operations: acquiring attribute and/or behavior data of multiple users within a current period by using the network interface 104, the attribute and/or behavior data of each user including multiple statistical indicators; converting the attribute and/or behavior data into standardized data; determining multiple group central points according to the standardized data, and placing the standardized data in a group where a group central point having a shortest distance is located; determining group features of groups according to standardized data in the groups; and separately pushing, by using the network interface 104, service push information of corresponding group features to users in the groups according to the group features of the groups.

In an embodiment, the processor 101 invokes the user grouping program stored in the memory 105 to further execute the following operation: separately calculating offset probabilities of statistical indicators in the groups according to the standardized data in the groups, comparing degrees of offset probabilities of a same statistical indicator in the groups, acquiring a group whose offset probability of the statistical indicator has a clearest difference from those of other groups, and using a numerical value feature of the statistical indicator as a group feature of the group.

In an embodiment, the processor 101 invokes the user grouping program stored in the memory 105 to further execute the following operations: when the attribute and/or behavior data is consecutive-type data, converting the attribute and/or behavior data into the standardized data by using the following formulas:

$$Xji_{standard}=(Xji-Xjmin)/(Xjmax-Xjmin);$$

$$Ui_{standard}=(X1i_{standard}, X2i_{standard}, \ldots, Xji_{standard}, \ldots, Xmi_{standard});$$

where $Xji_{standard}$ is standardized data after conversion of $Xji$, $Xjmax$ is attribute and/or behavior data having a largest numerical value in all attribute and/or behavior data of a jth statistical indicator within the current period, and $Xjmin$ is attribute and/or behavior data having a smallest numerical value in all attribute and/or behavior data of the jth statistical indicator within the current period.

In an embodiment, the processor 101 invokes the user grouping program stored in the memory 105 to further execute the following operations: when the attribute and/or behavior data is category-type data, converting the attribute and/or behavior data into the standardized data. The data conversion process includes categorizing values of attribute and/or behavior data in a same statistical indicator, and categorizing same values into one type, values after categorization including Y1, Y2, . . . , Ye, . . . , Yf, where f is a total number of value categories, e is a category sequence number of a value, and Ye is an eth type value; determining whether f is smaller than or equal to 2; when f is smaller than or equal to 2, determine whether Y1 and Y2 are only 0 or 1; skipping, if Y1 and Y2 are only 0 or 1, numerical value conversion, use the original attribute and/or behavior data as standardized data Xji; converting, if Y1 and Y2 are not only 0 or 1, Y1 into 0, and converting Y2 into 1, or converting Y1 into 1, and converting Y2 into 0, and using the data after conversion as standardized data Xji; and taking, when f is greater than 2, if a value of the attribute and/or behavior data is Ye, the value corresponding to Ye as 1, taking values other than Ye as 0, converting, in an arrangement order of Y1, Y2, . . . , Ye, . . . , Yf, the values of the attribute and/or behavior data into f-digit binary type data, and multiplying the binary type data after conversion by $1/\sqrt{2}$, to obtain standardized data $Xji_{standard}$.

In an embodiment, the processor 101 invokes the user grouping program stored in the memory 105 to further execute the following operations: acquiring any piece from all standardized data as a first initial group central point C01; searching the standardized data except C01 for standardized data having a longest distance away from C01, and using the standardized data having the longest distance away from C01 as a second initial group central point C02; calculating a distance Di1 from C01 and a distance Di2 from C02 separately of each piece of standardized data $Ui_{standard}$ in the standardized data except C01 and C102, selecting the smaller value in Di1 and Di2 as a distance of $Ui_{standard}$ from a central point set {C01, C02}, comparing values of distances of the standardized data from the central point set {C01, C02}, and choosing standardized data having a largest distance from the central point set {C01, C02} as a third initial group central point C03; calculating a distance Di1 from C01, a distance Di2 from C02, and a distance Di3 from C03 separately of each piece of standardized data $Ui_{standard}$ in the standardized data except C01, C02, and C03, selecting the smallest value in Di1, Di2, and Di3 as a distance of $Ui_{standard}$ from a central point set {C01, C02, C03}, comparing values of distances of the standardized data from the central point set {C01, C02, C03}, and choosing standardized data having a largest distance from the central point set {C01, C02, C03} as a fourth initial group central point C04; performing a similar process until k initial group central points C01, C02 . . . , C0k are determined, where k is a preset total number of groups; calculating a distance of each piece of standardized data from each initial group central point, and placing the standardized data in a group where an initial group central point having a shortest distance is located; separately calculating average values of the standardized data in the groups, and separately using the average values as k calibrated group central points C11, C12, . . . , C1k after a first iteration; calculating distances of each piece of standardized data from calibrated group central points after the first iteration, and placing the standardized data in a group where a calibrated group central point having a shortest distance is located; separately calculating average values of the standardized data in the groups after the first iteration, and separately using the average values as k calibrated group central points C21, C22, . . . , C2k after a second iteration; performing a similar process until, after distances between calibrated group central points after a current iteration and corresponding calibrated group central points after a previous iteration are calculated, a sum of k distances is within a preset range, or until the number of iterations reaches a preset number of times, and using k calibrated group central points after the current iteration as the final group central points; and calculating distances of each piece of standardized data from the final group central points, and placing the standardized data in a group where a final group central point having a shortest distance is located.

In an embodiment, the processor 101 invokes the user grouping program stored in the memory 105 to further execute the following operations:

calculating average values of statistical indicators of all standardized data:

$$Q01_{standard}, Q02_{standard}, \ldots, Q0j_{standard}, \ldots, Q0m_{standard};$$

$$Q0j_{standard} = (Xj1_{standard} + Xj2_{standard} + \ldots + Xjn_{standard})/n;$$

where $Q0j_{standard}$ is an average value of the jth statistical indicator in all the standardized data; in finally determined groups, separately calculating average values $Qt1_{standard}$, $Qt2_{standard}, \ldots, Qtj_{standard}, \ldots, Qtm_{standard}$ of the statistical indicators in the groups, where t is a group sequence number, $1 \leq t \leq k$, and $Qtj_{standard}$ is an average value of the jth statistical indicator in a t-th groups; separately calculating offset probabilities of the statistical indicators in the groups:

$$Pt1_{standard}, Pt2_{standard}, \ldots, Ptj_{standard}, \ldots, Ptm_{standard};$$

$$Ptj_{standard} = (Qtj_{standard} - Q0j_{standard})/Q0j_{standard};$$

where $Ptj_{standard}$ is an offset probability of the jth statistical indicator in the t-th group; and comparing degrees of $P1j_{standard}$, $P2j_{standard}$, ..., $Ptj_{standard}$, ..., $Pkj_{standard}$, acquiring the group whose offset probability in the jth statistical indicator has a clearest difference from those of the other groups, and using a numerical value feature of the jth statistical indicator as the group feature of the group.

In an embodiment, the processor 101 invokes the user grouping program stored in the memory 105 to further execute the following operations: acquiring attribute and/or behavior data of users within a next period, and converting the attribute and/or behavior data of the users within the next period into standardized data; placing the standardized data of the users within the next period in a group where a group central point having a shortest distance is located; and pushing, according to group features of groups of the users within the next period, service push information of corresponding group features to the users within the next period.

In the present disclosure, the computer programs used to implement various user grouping function, as described above, may be referred to as modules or units of computer programs. Each module or unit of computer programs may include one or more computer programs used in carrying our certain functions.

In the server where the apparatus for grouping network service users described in FIG. 1 is located in this embodiment, users are grouped in a precise manner according to attribute and/or behavior data of the users, so that formed groups have respective group features, grouping is more accurate, and push of service information is more reasonable.

Figure 2:
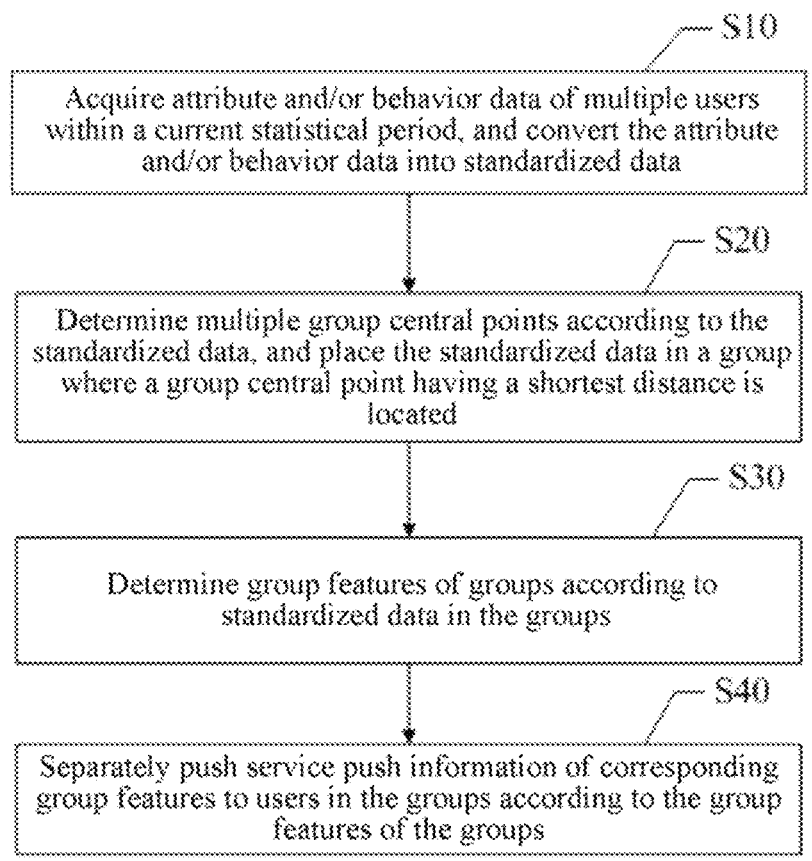
FIG. 2 illustrates a flowchart of a first embodiment of a method for grouping network service users according to the present disclosure.

As shown in FIG. 2, FIG. 2 illustrates a flowchart of a first embodiment of a method for grouping network service users according to the present disclosure. The method for grouping network service users mentioned in this embodiment includes the following steps.

Step S10: Acquire attribute and/or behavior data of multiple users within a current period, the attribute and/or behavior data of each user including multiple statistical indicators, and convert the attribute and/or behavior data into standardized data.

When a user accesses a network service by using the terminal device, the server receives corresponding operation instructions, and executes corresponding network service operations according to these operation instructions. Meanwhile, to group the users in a reasonable manner, the server further performs statistics on data of operations of the users, including data of multiple statistical indicators such as a total number of days of access by a user within a period, a total number of times of access within a period, total duration of access within a period, a total number of projects that a user joins within a period, and expenditure. Attribute and/or behavior data of the multiple statistical indicators are combined to form attribute and/or behavior data of the user. The attribute and/or behavior data includes multiple dimensions, that is, one dimension corresponds to one statistical indicator. Because units and statistical standards of statistical indicators are different, for ease of grouping, attribute and/or behavior data of the statistical indicators in the attribute and/or behavior data needs to be converted into a uniform standard, that is, into standardized data.

Step S20: Determine multiple group central points according to the standardized data, and place the standardized data in a group where a group central point having a shortest distance is located.

The number of the group central points is determined according to a preset number of groups to form, each group includes one group central point, and the group central point may be chosen from the standardized data, or may also be obtained in a manner of calculating an average value, a root mean square, and the like by using the standardized data, or obtained by using a k-means clustering algorithm. After the group central points are determined, each piece of standardized data is compared with each group central point, so as to find one group central point that has a shortest distance from the standardized data, and place the standardized data in a group where the group central point is located.

Step S30: Determine group features of groups according to standardized data in the groups.

After groups are formed, the characteristics of the groups need to be analyzed. Each piece of standardized data includes multiple statistical indicators, and the standardized data in the groups have differences, and the differences of the standardized data in the groups are analyzed, to determine the group features of the groups.

Step S40: Separately push service push information of corresponding group features to users in the groups according to the group features of the groups.

After the groups are formed and features are analyzed, the server works out a push solution according to the features, and pushes service information of corresponding features to user terminals in the groups, for example, in an online video service, pushes latest news information to users that frequently access news-type videos, and pushes latest popular TV shows and the like to users that frequently access TV shows.

In this embodiment, users are grouped in a precise manner according to attribute and/or behavior data of the users, so that formed groups have respective group features, grouping is more accurate, and push of service information is more reasonable.

Furthermore, in step S10, the attribute and/or behavior data includes:

$$U1 = (X11, X21, \ldots, Xj1, \ldots, Xm1);$$
$$U2 = (X12, X22, \ldots, Xj2, \ldots, Xm2);$$
$$\ldots$$
$$Ui = (X1i, X2i, \ldots, Xji, \ldots, Xmi);$$
$$\ldots$$
$$Un = (X1n, X2n, \ldots, Xjn, \ldots, Xmn);$$

where i is a sequence number of a user, n is an acquired total number of users, Ui is attribute and/or behavior data of an ith user, j is a sequence number of a statistical indicator of attribute and/or behavior data, m is a total number of statistical indicators of attribute and/or behavior data, Xj is attribute and/or behavior data of a jth statistical indicator, and Xji is attribute and/or behavior data of the jth statistical indicator of the ith user.

For example, the attribute and/or behavior data is represented in the following table:

| User ID | Active | | | Payment | |
| --- | --- | --- | --- | --- | --- |
| | Active days | Active times | Active duration | Payment times | Payment amount |
| User1 | X11 | X21 | X31 | X41 | X51 |
| User2 | X12 | X22 | X32 | X42 | X52 |
| ... | ... | ... | ... | ... | ... |
| User-n | X1n | X2n | X3n | X4n | X5n |

Furthermore, when the attribute and/or behavior data is consecutive-type data, for example, a value range of consecutive numbers, the attribute and/or behavior data is converted into the standardized data by using the following formulas:

$$Xji_{standard} = (Xji - Xjmin)/(Xjmax - Xjmin);$$

$$Ui_{standard} = (X1i_{standard}, X2i_{standard}, \ldots, Xji_{standard}, \ldots, Xmi_{standard});$$

where $Xji_{standard}$ is standardized data after conversion of Xji, Xjmax is attribute and/or behavior data having a largest numerical value in all attribute and/or behavior data of the jth statistical indicator within the current period, and Xjmin is attribute and/or behavior data having a smallest numerical value in all attribute and/or behavior data of the jth statistical indicator within the current period.

In the foregoing manner, attribute and/or behavior data of statistical indicators in consecutive-type attribute and/or behavior data is converted into standardized data of a uniform standard, so as to mitigate a problem that units and statistical standards of the statistical indicators are different, thereby simplifying calculation of attribute and/or behavior data of multiple dimensions and facilitate a processing procedure of grouping.

Figure 3:
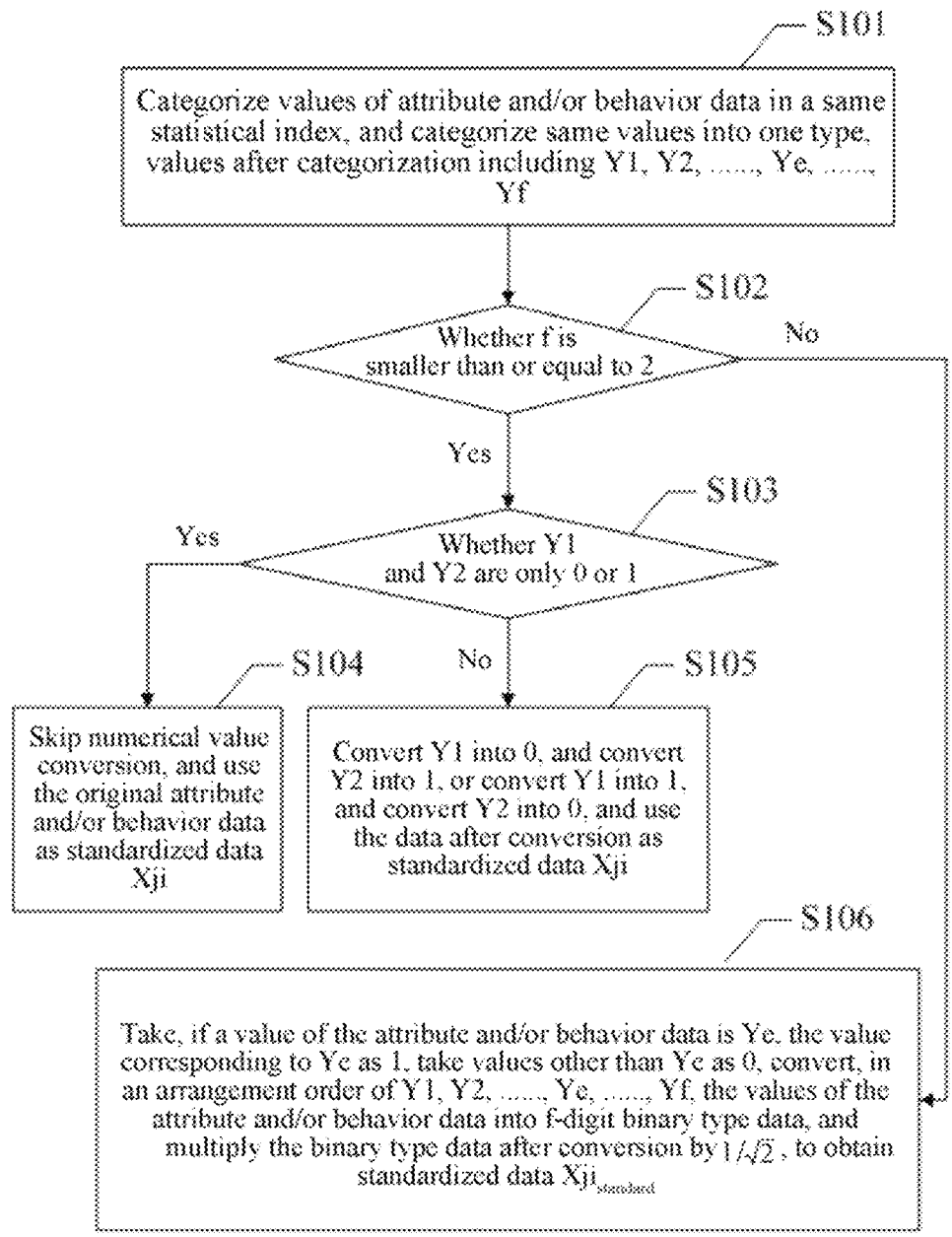
FIG. 3 illustrates a flowchart of steps of standardizing category-type data in the first embodiment of the method for grouping network service users according to the present disclosure.

As shown in FIG. 3, FIG. 3 illustrates a flowchart of steps of standardizing category-type data in the first embodiment of the method for grouping network service users according to the present disclosure. The attribute and/or behavior data in this embodiment is category-type data. For example, user levels include Level 1, Level 2, and Level 3, and member types include a non-member, an ordinary member, and an advanced member. Different from the manner used to standardize consecutive-type data in the embodiment shown in FIG. 2, in this embodiment, the categorized attribute and/or behavior data may be converted into standardized data by using the following steps:

Step S101: Categorize values of attribute and/or behavior data in a same statistical indicator, and categorize same values into one type, values after categorization including Y1, Y2, . . . , Ye, . . . , Yf, where f is a total number of value categories, e is a category sequence number of a value, and Ye is an eth type value.

Step S102: Determine whether f is smaller than or equal to 2; and if f is smaller than or equal to 2, execute step S103; or if f is not smaller than or equal to 2, execute step S106.

Step S103: Determine whether Y1 and Y2 are only 0 or 1; and if Y1 and Y2 are only 0 or 1, execute step S104; or if Y1 and Y2 are not only 0 or 1, execute step S105.

Step S104: Skip numerical value conversion, and use the original attribute and/or behavior data as standardized data Xji.

If where f is smaller than or equal to 2 and Y1 and Y2 are only 0 or 1, for example, assuming that a statistical indicator is a member type, which includes two types: a member and a non-member, a value corresponding to a member is 1, and a value corresponding to a non-member is 0, numerical value conversion is skipped, and the original attribute and/or behavior data is used as standardized data Xji.

Step S105: Convert Y1 into 0, and convert Y2 into 1, or convert Y1 into 1, and convert Y2 into 0, and use the data after conversion as standardized data Xji.

If f is smaller than or equal to 2 and Y1 and Y2 are not only 0 and 1, for example, assuming that a statistical indicator is a user level, including two types: a Level 1 user and a Level 2 user, a numerical value corresponding to the Level 1 user is 1, and a numerical value corresponding to the Level 2 user is 2, numerical value conversion needs to be performed on the values, so that the Level 1 user after conversion is endowed with the value 0 (or 1), and the Level 2 user after conversion is endowed with the value 1 (or 0).

Step S106: Take, if a value of the attribute and/or behavior data is Ye, the value corresponding to Ye as 1, take values other than Ye as 0, convert, in an arrangement order of Y1, Y2, . . . , Ye, . . . , Yf, the values of the attribute and/or behavior data into f-digit binary type data, and multiply the binary type data after conversion by $1/\sqrt{2}$, to obtain standardized data $Xji_{standard}$.

If f is greater than 2, for example, assuming that a statistical indicator is a member type, including three types: an ordinary member, a silver card member, and a gold card member, numerical value conversion needs to be performed on the values, where an ordinary member corresponds to Y1, a silver card member corresponds to Y2, and a gold card member corresponds to Y3. A user U1 is an ordinary member, Y1=1, Y2=0, Y3=0, and binary type data of a value of the member type of the user U1 after conversion is (1, 0, 0); a user U2 is a silver card member, Y1=0, Y2=1, Y3=0, and binary type data of a value of the member type of the user U2 after conversion is (0, 1, 0); and a user U3 is a gold card member, Y1=0, Y2=0, Y3=1, and binary type data of a value of the member type of the user U3 after conversion is (0, 0, 1). In addition, when a distance between two pieces of standardized data is calculated, to make a distance range between 0 and 1, in a case where f is greater than 2, after conversion of binary type data, the binary type data after conversion further needs to be multiplied by $1/\sqrt{2}$. For example, in the foregoing embodiment, standardized data of the member type of the user U1 is $(1/\sqrt{2}, 0, 0)$, standardized data of the member type of the user U2 is $(0, 1/\sqrt{2}, 0)$, and standardized data of the member type of the user U3 is $(0, 0, 1/\sqrt{2})$.

As described above, attribute and/or behavior data of statistical indicators in categorized attribute and/or behavior data is converted into standardized data of a uniform standard, so that statistical indicators of different values are replaced with standardized data using 0 and 1, thereby simplifying calculation of attribute and/or behavior data of multiple dimensions, and facilitate a processing procedure of grouping.

Figure 4:
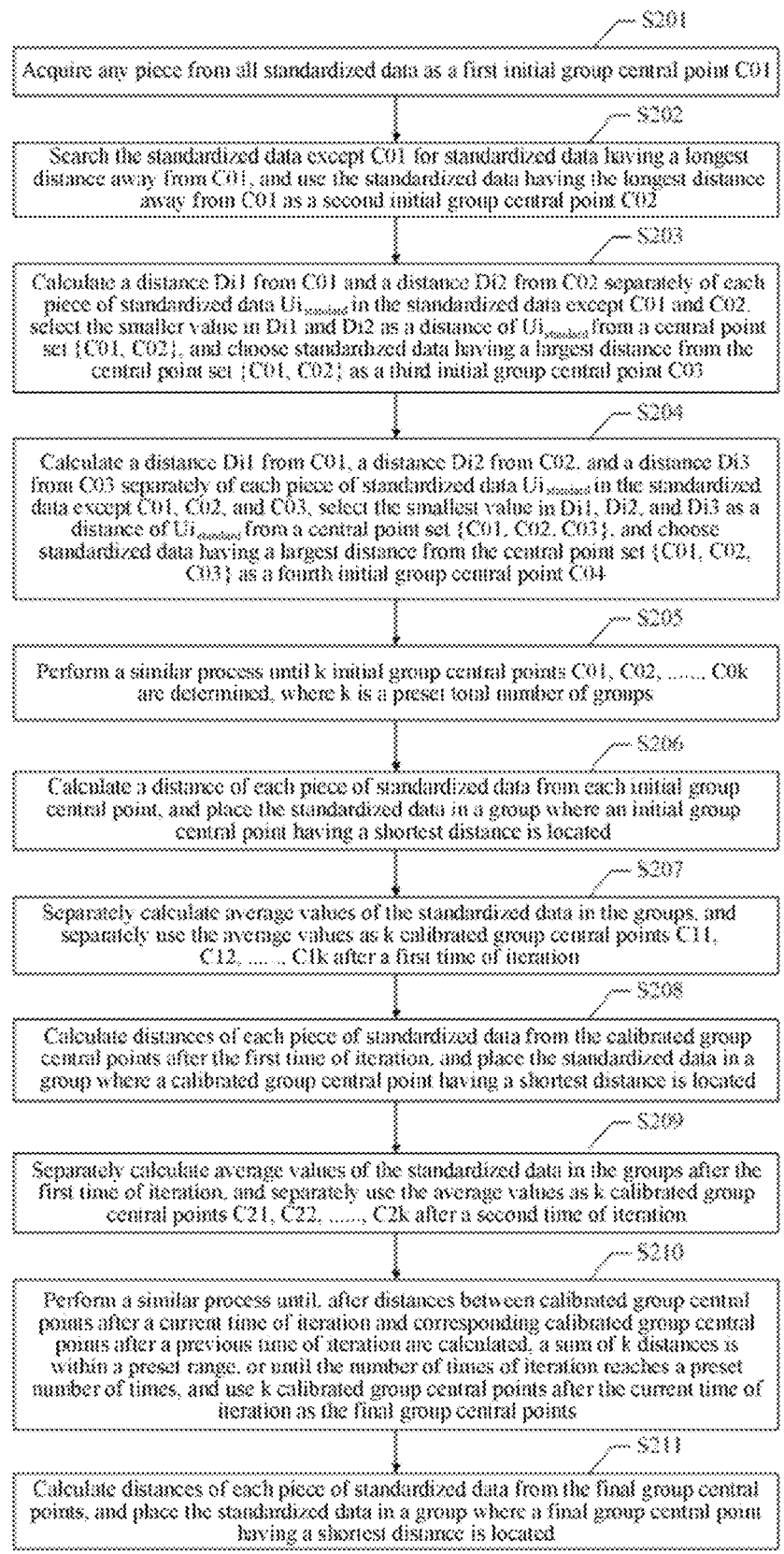
FIG. 4 illustrates a flowchart of steps of grouping in the first embodiment of the method for grouping network service users according to the present disclosure.

As shown in FIG. 4, FIG. 4 is a flowchart of steps of grouping in the first embodiment of the method for grouping network service users according to the present disclosure. In this embodiment, step S20 in the embodiment shown in FIG. 2 is describe in detail, and the k-means clustering algorithm is used for grouping, where the group central points include initial group central points, calibrated group central points, and final group central points, and step S20 specifically includes the following steps:

Step S201: Acquire any piece from all standardized data as a first initial group central point C01.

Step S202: Search the standardized data except C01 for standardized data having a longest distance away from C01, and use the standardized data having the longest distance away from C01 as a second initial group central point C02.

Distances from C01 are separately calculated for rest data after the data that has been chosen as the first initial group central point C01 is removed from all the standardized data. A distance between two pieces of standardized data is calculated by using a Euclidean distance formula. For example, C01=U1=(X11, X21, ..., Xj1, ..., Xm1), and a distance between Ui=(X1i, X2i, ..., Xji, ..., Xmi) and C01 may be calculated by using the following formula:

$$Di = \sqrt{\begin{array}{c}(X11-X1i)^2 + (X21-X2i)^2 + \ldots + \\ (Xj1-Xji)^2 + \ldots + (Xm1-Xmi)^2\end{array}}.$$

Standardized data with the largest Di value is standardized data having a longest distance away from C01, and is used as the second initial group central point C02.

Step S203: Calculate a distance Di1 from C01 and a distance Di2 from C02 separately of each piece of standardized data $Ui_{standard}$ in the standardized data except C01 and C02, select the smaller value in Di1 and Di2 as a distance of $Ui_{standard}$ from a central point set {C01, C02}, compare values of distances of the standardized data from the central point set {C01, C02}, and choose standardized data having a largest distance from the central point set {C01, C02} as a third initial group central point C03.

During calculation of the third initial group central point C03, distances of the standardized data except C01 and C02 from the central point set {C01, C02} are calculated, and one piece of data standardized data having a longest distance from the central point set {C01, C02} is chosen as the third initial group central point C03.

Step S204: Calculate a distance Di1 from C01, a distance Di2 from C02, and a distance Di3 from C03 separately of each piece of standardized data $Ui_{standard}$ in the standardized data except C01, C02, and C03, select the smallest value in Di1, Di2, and Di3 as a distance of $Ui_{standard}$ from a central point set {C01, C02, C03}, compare values of distances of the standardized data from the central point set {C01, C02, C03}, and choose standardized data having a largest distance from the central point set {C01, C02, C03} as a fourth initial group central point C04.

Step S205: Perform a similar process until k initial group central points C01, C02, ..., C0k are determined, where k is a preset total number of groups.

Subsequent initial group central points are calculated in a manner similar to that of calculating C03 until initial group central points of a preset number are found.

Step S206: Calculate a distance of each piece of standardized data from each initial group central point, and place the standardized data in a group where an initial group central point having a shortest distance is located.

After initial group central points are determined, initial grouping is performed on the standardized data. A Euclidean distance formula is still used to calculate the distances from standardized data to the initial group central points, and place the standardized data in a group where an initial group central point having a shortest distance is located.

Step S207: Separately calculate average values of the standardized data in the groups, and separately use the average values as k calibrated group central points C11, C12, ..., C1k after a first iteration.

After initial grouping is completed, a manner of calculating average values of the groups is used to obtain calibrated values of group central points after one iteration, that is, calibrated group central points. During calculation of the average values, the average values are separately calculated by using standardized data of the statistical indicators in the groups. For example, a first group includes the following data:

$$U1=(X11, X21, \ldots, Xj1, \ldots, Xm1);$$

$$U3=(X13, X23, \ldots, Xj3, \ldots, Xm3);$$

$$U5=(X15, X22, \ldots, Xj5, \ldots, Xm5); \text{ and}$$

a first calibrated group central point after the first iteration is:

$$C11 = \left(\frac{X11+X13+X15}{3}, \frac{X21+X23+X25}{3}, \ldots, \frac{Xm1+Xm3+Xm5}{3}\right).$$

Step S208: Calculate distances of each piece of standardized data from the calibrated group central points after the first iteration, and place the standardized data in a group where a calibrated group central point having a shortest distance is located.

The standardized data is grouped again. A Euclidean distance formula is still used to calculate distances of the standardized data from the calibrated group central points, and the standardized data is placed in a group where a calibrated group central point having a shortest distance is located.

Step S209: Separately calculate average values of the standardized data in the groups after the first iteration, and separately use the average values as k calibrated group central points C21, C22, ..., C2k after a second iteration.

Step S210: Perform a similar process until, after distances between calibrated group central points after a current iteration and corresponding calibrated group central points after a previous iteration are calculated, a sum of k distances is within a preset range, or until the number of iterations reaches a preset number of times, and use k calibrated group central points after the current iteration as the final group central points.

After multiple iterations, calibrated group central points are calculated repeatedly and grouping is performed repeatedly, and iteration stops until calibrated group central points after multiple iterations do not change or change slightly or the preset number of iterations is reached. When it is determined that calibrated group central points of two consecutive iterations do not change or change slightly, the following manner may be used:

For example, the k calibrated group central points after the first iteration are C11, C12, ..., C1k, and the k calibrated group central points after the second iteration are C21, C22, ..., C2k; distances between corresponding calibrated group central points of two consecutive iterations are calculated: a distance D1 between C11 and C21, a distance D2 between C12 and C22, ..., a distance Dk between C1k and C2k; it may be separately determined whether D1, D2, ..., Dk are within a preset range; in addition, a sum of D1, D2, ..., Dk may further be calculated to obtain a sum of distances Sum(D), and it is determined whether Sum(D) is within a preset range; and when D1, D2, ..., Dk are all within a preset range, or Sum(D) is within a preset range, it is considered that calibrated group central points of two consecutive iterations do not change or change slightly.

Step S211: Calculate distances of each piece of standardized data from the final group central points, and place the standardized data in a group where a final group central point having a shortest distance is located.

After the final group central points are obtained, the standardized data is placed again in a group where a final group central point having a shortest distance is located, so as to complete grouping.

In this embodiment, a k-means clustering algorithm is used to group users in a precise manner, so that formed groups are more accurate, and reasonable push of service information is facilitated.

Figure 5:
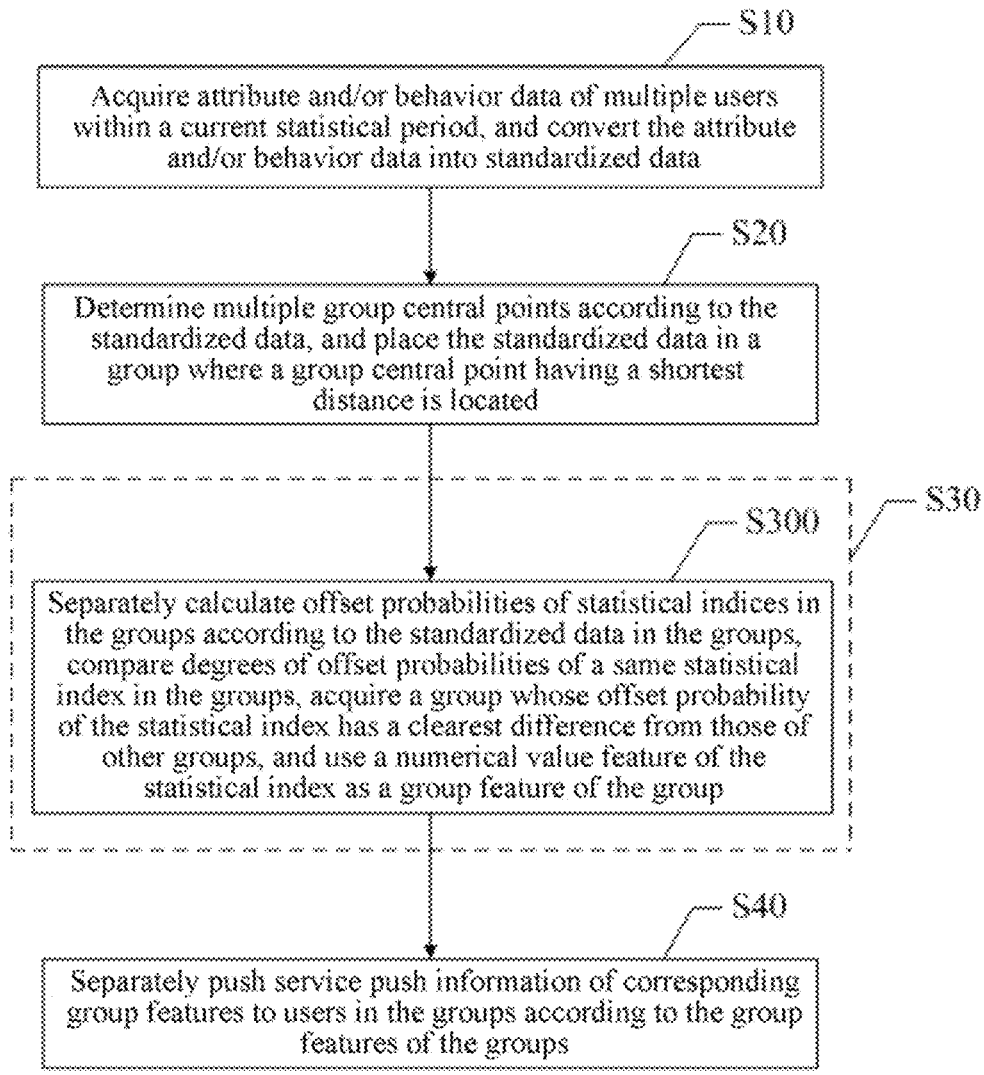
FIG. 5 illustrates a flowchart of steps of determining a group feature in the first embodiment of the method for grouping network service users according to the present disclosure.

As shown in FIG. 5, FIG. 5 is a flowchart of steps of determining a group feature in the first embodiment of the method for grouping network service users according to the present disclosure. In this embodiment, step S30 in the embodiment shown in FIG. 2 is described in detail, and step S30 specifically includes the following steps.

Step S300: Separately calculate offset probabilities of statistical indicators in the groups according to the standardized data in the groups, compare degrees of offset probabilities of a same statistical indicator in the groups, acquire a group whose offset probability of the statistical indicator has a clearest difference from those of other groups, and use a numerical value feature of the statistical indicator as a group feature of the group.

When a group feature is determined, degrees of offset probabilities of a same statistical indicator in the groups may be compared, one group having a clearest feature is found through comparison, and a numerical value feature of the statistical indicator is used as the group feature of the group. For example, the statistical indicator is the number of times of access. An offset probability of the number of times of access of a group 1 is much larger than those of other groups, and a numerical value feature of the number of times of access of the group 1 is that the number of times of access is large, and the numerical value feature is used as a group feature of the group 1. An offset probability of the number of times of access of a group 2 is much smaller than those of other groups, and a numerical value feature of the number of times of access of the group 2 is the number of times of access is small, and the numerical value feature is used as a group feature of the group 2. An offset probability may be calculated in multiple manners. For example, in one group, all standardized data of one statistical indicator is acquired, and an average value or a root mean square of the standardized data is calculated and used as an offset probability, and degrees of offset probabilities are then compared.

In this embodiment, offset probabilities of groups in statistical indicators are calculated to determine group features of the groups, and the formed groups have respective group features, so that service information is pushed according to the features of the groups, and information push becomes more reasonable.

Figure 6:
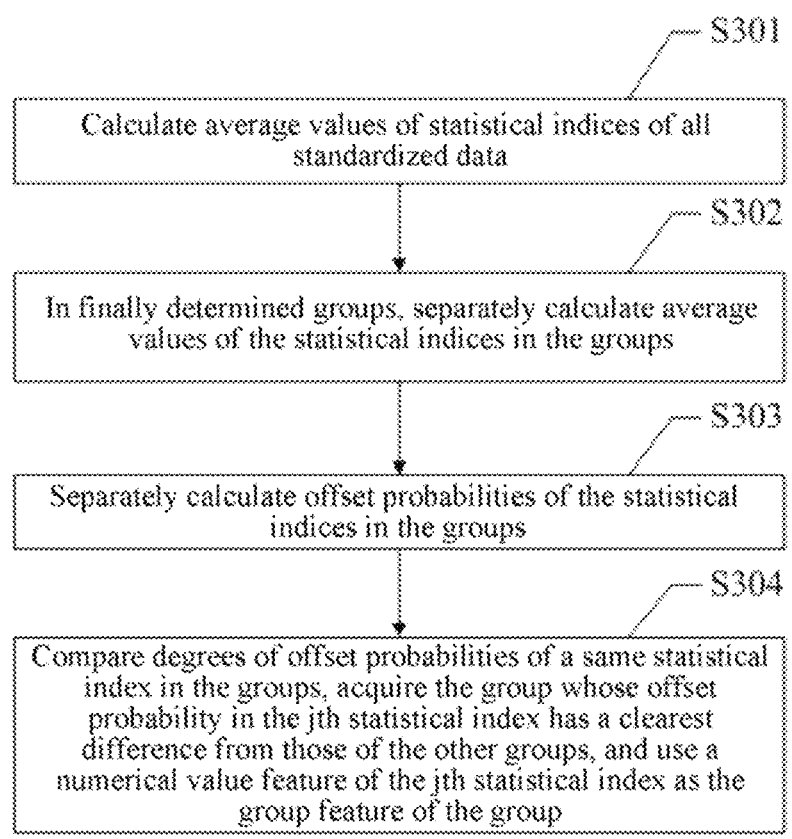
FIG. 6 illustrates a flowchart of further detailed steps of determining a group feature in the first embodiment of the method for grouping network service users according to the present disclosure.

As shown in FIG. 6, FIG. 6 is a flowchart of further detailed steps of determining a group feature in the first embodiment of the method for grouping network service users according to the present disclosure. In this embodiment, step S300 in the embodiment shown in FIG. 5 is described in detail, and specifically includes the following steps:

Step S301: Calculate average values of statistical indicators of all standardized data:

$$Q01_{standard}, Q02_{standard}, \ldots, Q0j_{standard}, \ldots, Q0m_{standard};$$

$$Q0j_{standard} = (Xj1_{standard} + Xj2_{standard} + \cdots + Xjn_{standard})/n;$$

where $Q0j_{standard}$ is an average value of the jth statistical indicator in all the standardized data.

Step S302: In finally determined groups, separately calculate average values $Qt1_{standard}, Qt2_{standard}, \ldots, Qtj_{standard}, \ldots, Qtm_{standard}$ of the statistical indicators in the groups, where t is a group sequence number, $1 \leq t \leq k$, and $Qtj_{standard}$ is an average value of the jth statistical indicator in a t-th group.

For example, one group includes the following standardized data:

$$U1_{standard} = (X11_{standard}, X21_{standard}, \ldots, Xj1_{standard}, \ldots, Xm1_{standard});$$

$$U3_{standard} = (X13_{standard}, X23_{standard}, \ldots, Xj3_{standard}, \ldots, Xm3_{standard});$$

$$U5_{standard} = (X15_{standard}, X22_{standard}, \ldots, Xj5_{standard}, \ldots, Xm5_{standard}); \text{ and}$$

$$Qtj_{standard} = (Xj1_{standard} + Xj3_{standard} + Xj5_{standard})/3.$$

Step S303: Separately calculate offset probabilities of the statistical indicators in the groups:

$$Pt1_{standard}, Pt2_{standard}, \ldots, Ptj_{standard}, \ldots, Ptm_{standard};$$

$$Ptj_{standard} = (Qtj_{standard} - Q0j_{standard})/Q0j_{standard};$$

where $Ptj_{standard}$ is an offset probability of the jth statistical indicator in the t-th group.

Step S304: Compare degrees of $P1j_{standard}, P2j_{standard}, \ldots, Ptj_{standard}, \ldots, Pkj_{standard}$, acquire the group whose offset probability in the jth statistical indicator has a clearest difference from those of the other groups, and use a numerical value feature of the jth statistical indicator as the group feature of the group.

Figure 9:
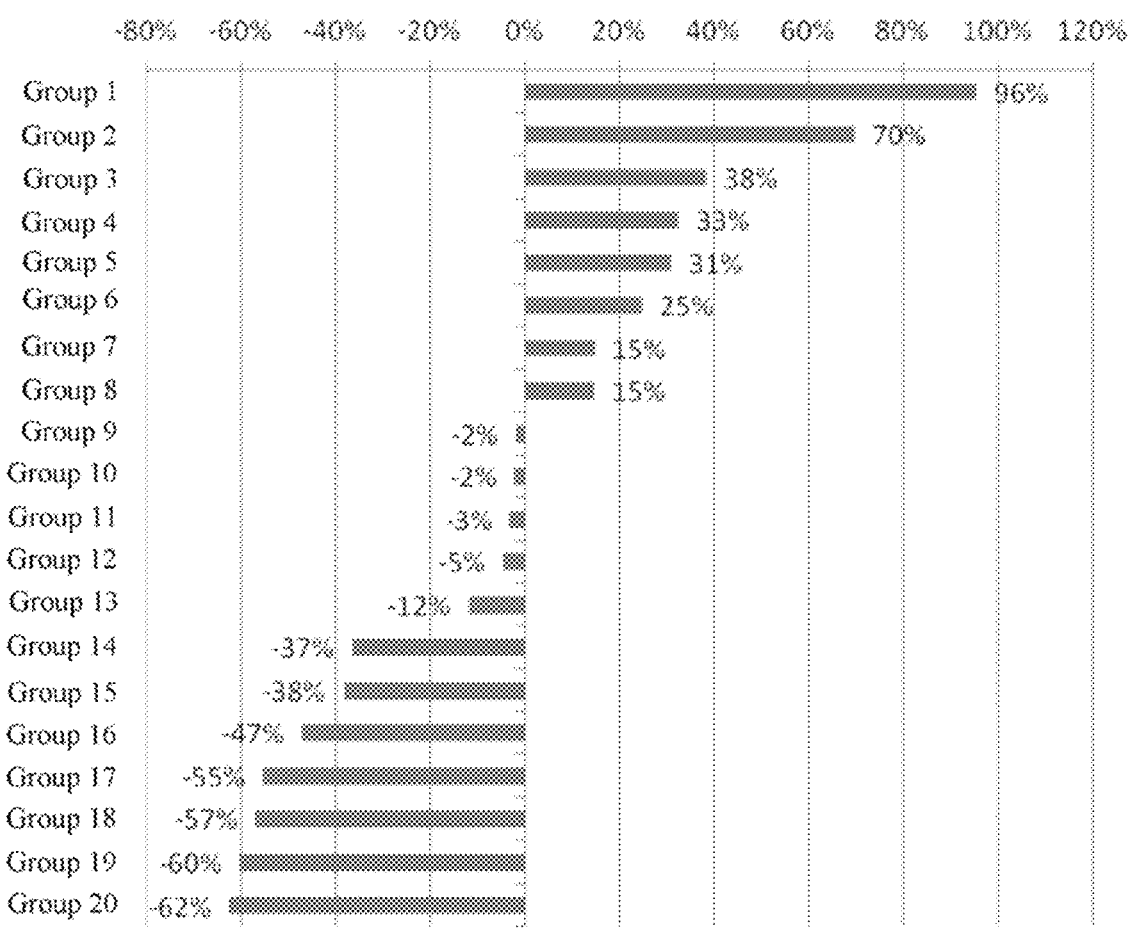
FIG. 9 illustrates a schematic diagram of a chart of offset probabilities of groups of a same statistical indicator in an embodiment of the present invention.

When the foregoing manner is used to obtain offset probabilities of groups in a same statistical indicator, reference may be also made to the chart shown in FIG. 9. In the chart, an offset of a group 1 is the clearest, and has a large offset as compared with other groups, so that a numerical value feature of the statistical indicator is used as a group feature of the group 1, that is, the statistical indicator of the group 1 has a large offset. If offset probabilities of the groups in the statistical indicator do not have clear differences, the number of groups to form may be set again or attribute and/or behavior data of users may be selected again, and group central points are determined again and grouping is performed again. When the group central points are determined again, points same as those of a previous time may be selected as initial group central points, so that subsequent grouping is more stable. In addition, during calculation of an offset probability, use of standardized data may also be omitted, and a group feature of a group may also be obtained by directly using attribute and/or behavior data.

In this embodiment, offset probabilities of groups in statistical indicators are calculated to determine group features of the groups, and the formed groups have respective group features, so that service information is pushed according to the features of the groups, and information push becomes more reasonable.

Figure 7:
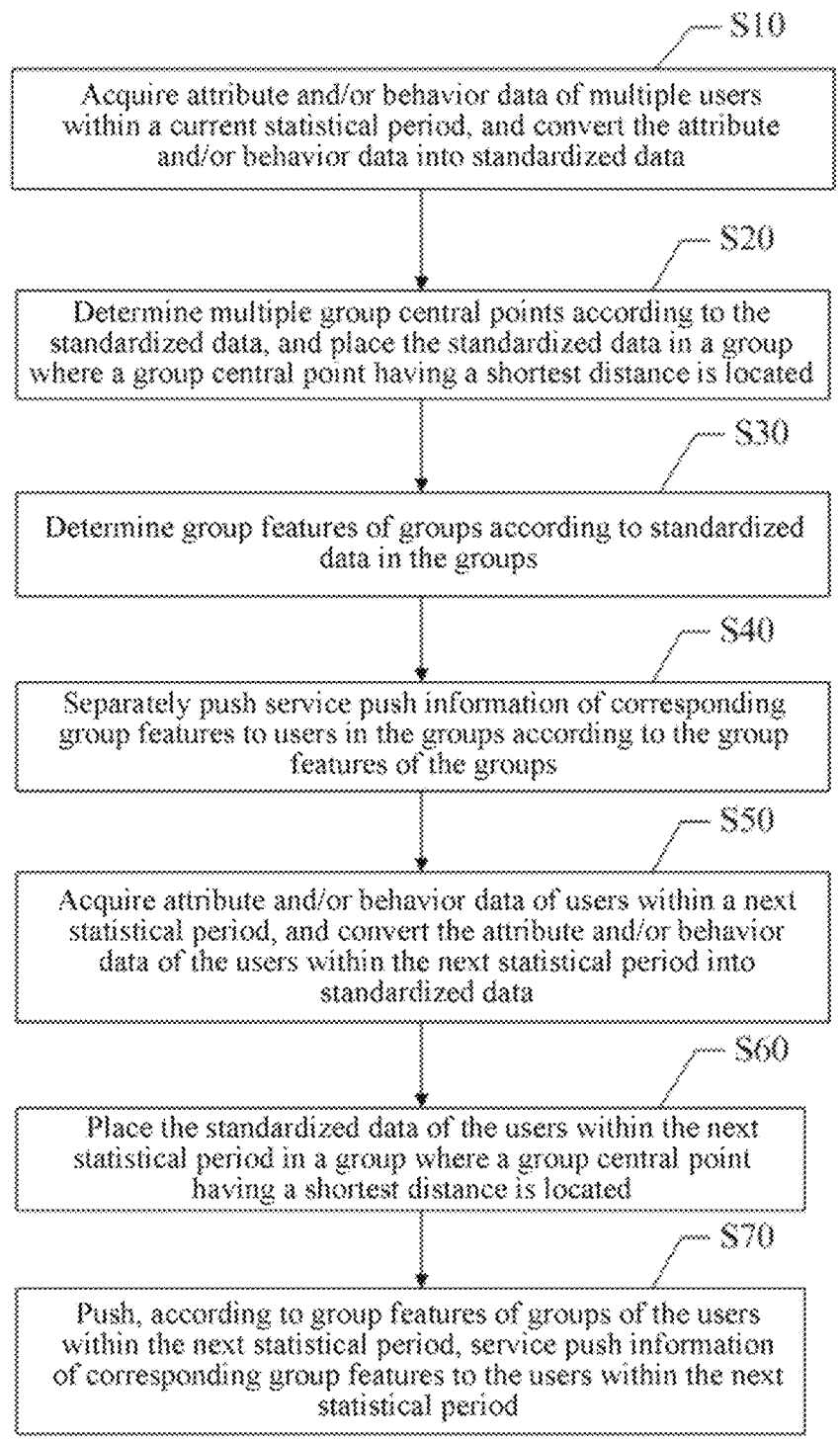
FIG. 7 illustrates a flowchart of a second embodiment of a method for grouping network service users according to the present disclosure.

As shown in FIG. 7, FIG. 7 is a flowchart of a second embodiment of a method for grouping network service users according to the present disclosure. In this embodiment, all steps in the embodiment shown in FIG. 2 are included, and the following steps are added after step S40:

Step S50: Acquire attribute and/or behavior data of users within a next period, and convert the attribute and/or behavior data of the users within the next period into standardized data.

Step S60: Place the standardized data of the users within the next period in a group where a group central point having a shortest distance is located.

Step S70: Push, according to group features of groups of the users within the next period, service push information of corresponding group features to the users within the next period.

In the embodiments shown in FIG. 2 to FIG. 6, a fixed model of grouping is obtained, and within a subsequent period, attribute and/or behavior data of users only needs to be input in the fixed model to implement grouping of the users, and reference may be made to the embodiments shown in FIG. 2 to FIG. 6 for a specific procedure of execution, which is no longer elaborated herein. Because the fixed model in the foregoing embodiment is used, within the subsequent period, grouping of users is more rapid and accurate, thereby making push of service information more reasonable, accurate, and convenient.

Figure 8:
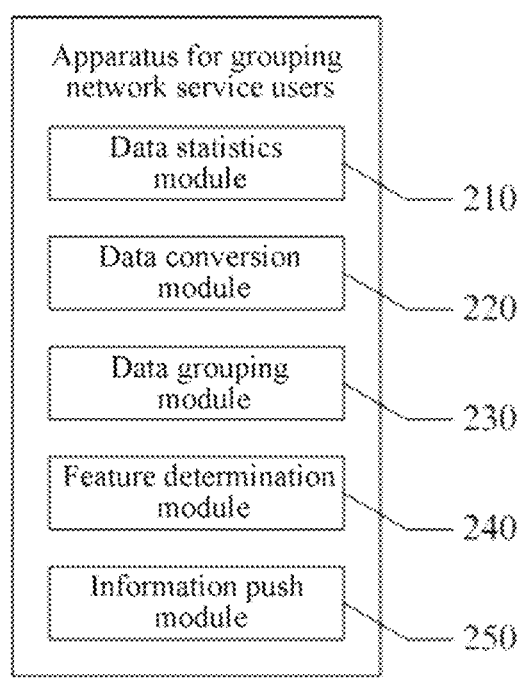
FIG. 8 illustrates a schematic structural diagram of an apparatus for grouping network service users in an embodiment of the present invention.

As shown in FIG. 8, FIG. 8 is a schematic structural diagram of an apparatus for grouping network service users in an embodiment of the present invention. The apparatus for grouping network service users mentioned in this embodiment includes: a data statistics module 210, configured to acquire attribute and/or behavior data of multiple users within a current period, the attribute and/or behavior data of each user including multiple statistical indicators; a data conversion module 220, configured to convert the attribute and/or behavior data into standardized data; a data grouping module 230, configured to determine multiple group central points according to the standardized data, and place the standardized data in a group where a group central point having a shortest distance is located; a feature determination module 240, configured to determine group features of groups according to standardized data in the groups; an information push module 250, configured to separately push service push information of corresponding group features to users in the groups according to the group features of the groups.

When a user accesses a network service by using the terminal device, the server receives corresponding operation instructions, and executes corresponding network service operations according to these operation instructions. Meanwhile, to group the users in a reasonable manner, the server further performs statistics on data of operations of the users, including data of multiple statistical indicators such as a total number of days of access by a user within a period, a total number of times of access within a period, total duration of access within a period, a total number of projects that a user joins within a period, and expenditure. Attribute and/or behavior data of the multiple statistical indicators are combined to constitute attribute and/or behavior data of the user. The attribute and/or behavior data includes multiple dimensions, that is, one dimension corresponds to one statistical indicator. Because units and statistical standards of statistical indicators are different, for ease of grouping, attribute and/or behavior data of the statistical indicators in the attribute and/or behavior data needs to be converted into a uniform standard, that is, into standardized data.

The number of the group central points is determined according to a preset number of groups to form, each group includes one group central point, and the group central point may be chosen from the standardized data, or may also be obtained in a manner of calculating an average value, a root mean square, and the like by using the standardized data, or obtained by using a k-means clustering algorithm. After the group central points are determined, each piece of standardized data is compared with each group central point, so as to find one group central point that has a shortest distance from the standardized data, and place the standardized data in a group where the group central point is located.

After groups are formed, the characteristics of the groups need to be analyzed. Each piece of standardized data includes multiple statistical indicators, and the standardized data in the groups have differences, and the differences of the standardized data in the groups are analyzed, to determine the group features of the groups.

After the groups are formed and features are analyzed, the server works out a push solution according to the features, and pushes service information of corresponding features to user terminals in the groups, for example, in an online video service, pushes latest news information to users that frequently access news-type videos, and pushes latest popular TV shows and the like to users that frequently access TV shows.

In this embodiment, users are grouped in a precise manner according to attribute and/or behavior data of the users, so that formed groups have respective group features, grouping is more accurate, and push of service information is more reasonable.

Furthermore, the attribute and/or behavior data acquired by the data statistics module 210 includes:

$U1 = (X11, X21, \ldots, Xj1, \ldots, Xm1);$ $U2 = (X12, X22, \ldots, Xj2, \ldots, Xm2);$ $\ldots;$ $Ui = (X1i, X2i, \ldots, Xji, \ldots, Xmi);$ $$U_n = (X1n, X2n, \ldots, Xjn, \ldots, Xmn);$$

where i is a sequence number of a user, n is an acquired total number of users, Ui is attribute and/or behavior data of an ith user, j is a sequence number of a statistical indicator of attribute and/or behavior data, m is a total number of statistical indicators of attribute and/or behavior data, Xj is attribute and/or behavior data of a jth statistical indicator, and Xji is attribute and/or behavior data of the jth statistical indicator of the ith user.

For example, the attribute and/or behavior data is represented in the following table:

| User ID | Active | | | Payment | |
| --- | --- | --- | --- | --- | --- |
|  | Active days | Active times | Active duration | Payment times | Payment amount |
| User1 | X11 | X21 | X31 | X41 | X51 |
| User2 | X12 | X22 | X32 | X42 | X52 |
| ... | ... | ... | ... | ... | ... |
| User-n | X1n | X2n | X3n | X4n | X5n |

Furthermore, when the attribute and/or behavior data is consecutive-type data, for example, a value range of consecutive numbers, the data conversion module 220 converts the attribute and/or behavior data into the standardized data by using the following formulas:

$$Xji_{standard} = (Xji - Xj\min)/(Xj\max - Xj\min);$$

$$Ui_{standard} = (X1i_{standard}, X2i_{standard}, \ldots, Xji_{standard}, \ldots, Xmi_{standard});$$

where $Xji_{standard}$ is standardized data after conversion of Xji, Xjmax is attribute and/or behavior data having a largest numerical value in all attribute and/or behavior data of the jth statistical indicator within the current period, and Xjmin is attribute and/or behavior data having a smallest numerical value in all attribute and/or behavior data of the jth statistical indicator within the current period.

In the foregoing manner, attribute and/or behavior data of statistical indicators in consecutive-type attribute and/or behavior data is converted into standardized data of a uniform standard, so as to mitigate a problem that units and statistical standards of the statistical indicators are different, thereby simplifying calculation of attribute and/or behavior data of multiple dimensions and facilitate a processing procedure of grouping.

Furthermore, when the attribute and/or behavior data is category-type data, For example, user levels include Level 1, Level 2, and Level 3, and member types include a non-member, an ordinary member, and an advanced member. The data conversion module 220 converts the attribute and/or behavior data into the standardized data in the following manner: categorizing values of attribute and/or behavior data in a same statistical indicator, and categorizing same values into one type, values after categorization including Y1, Y2, ..., Ye, ..., Yf, where f is a total number of value categories, e is a category sequence number of a value, and Ye is an eth type value; determining whether f is smaller than or equal to 2; determining, when f is smaller than or equal to 2, whether Y1 and Y2 are only 0 or 1; skipping, if Y1 and Y2 are only 0 or 1, numerical value conversion, and using the original attribute and/or behavior data as standardized data Xji; converting, if Y1 and Y2 are not only 0 or 1, Y1 into 0, and converting Y2 into 1, or converting Y1 into 1, and converting Y2 into 0, and using the data after conversion as standardized data Xji; and taking, when f is greater than 2, if a value of the attribute and/or behavior data is Ye, the value corresponding to Ye as 1, taking values other than Ye as 0, converting, in an arrangement order of Y1, Y2, ..., Ye, ..., Yf, the values of the attribute and/or behavior data into f-digit binary type data, and multiplying the binary type data after conversion by $1/\sqrt{2}$, to obtain standardized data $Xji_{standard}$.

In a case where f is smaller than or equal to 2 and Y1 and Y2 are only 0 or 1, for example, assuming that a statistical indicator is a member type, which includes two types: a member and a non-member, a value corresponding to a member is 1, and a value corresponding to a non-member is 0, numerical value conversion is skipped, and the original attribute and/or behavior data is used as standardized data Xji.

In a case where f is smaller than or equal to 2 and Y1 and Y2 are not only 0 and 1, for example, assuming that a statistical indicator is a user level, including two types: a Level 1 user and a Level 2 user, a numerical value corresponding to the Level 1 user is 1, and a numerical value corresponding to the Level 2 user is 2, numerical value conversion needs to be performed on the values, so that the Level 1 user after conversion is endowed with the value 0 (or 1), and the Level 2 user after conversion is endowed with the value 1 (or 0).

In a case where f is greater than 2, for example, assuming that a statistical indicator is a member type, including three types: an ordinary member, a silver card member, and a gold card member, numerical value conversion needs to be performed on the values, where an ordinary member corresponds to Y1, a silver card member corresponds to Y2, and a gold card member corresponds to Y3. A user U1 is an ordinary member, Y1=1, Y2=0, Y3=0, and binary type data of a value of the member type of the user U1 after conversion is (1, 0, 0); a user U2 is a silver card member, Y1=0, Y2=1, Y3=0, and binary type data of a value of the member type of the user U2 after conversion is (0, 1, 0); and a user U3 is a gold card member, Y1=0, Y2=0, Y3=1, and binary type data of a value of the member type of the user U3 after conversion is (0, 0, 1). In addition, when a distance between two pieces of standardized data is calculated, to make a distance range between 0 and 1, in a case where f is greater than 2, after conversion of binary type data, the binary type data after conversion further needs to be multiplied by $1/\sqrt{2}$. For example, in the foregoing embodiment, standardized data of the member type of the user U1 is $(1/\sqrt{2}, 0, 0)$, standardized data of the member type of the user U2 is $(0, 1/\sqrt{2}, 0)$, and standardized data of the member type of the user U3 is $(0, 0, 1/\sqrt{2})$.

In the foregoing manner, attribute and/or behavior data of statistical indicators in categorized attribute and/or behavior data is converted into standardized data of a uniform standard, so that statistical indicators of different values are replaced with standardized data using 0 and 1, thereby simplifying calculation of attribute and/or behavior data of multiple dimensions, and facilitate a processing procedure of grouping.

Furthermore, the group central points include initial group central points, calibrated group central points, and final group central points; and the data grouping module 230 is further configured to: acquire any piece from all standardized data as a first initial group central point C01; search the standardized data except C01 for standardized data having a longest distance away from C01, and use the standardized data having the longest distance away from C01 as a second initial group central point C02; calculate a distance Di1 from C01 and a distance Di2 from C02 separately of each piece of standardized data $Ui_{standard}$ in the standardized data except C01 and C02, select the smaller value in Di1 and Di2 as a distance of $Ui_{standard}$ from a central point set {C01, C02}, compare values of distances of the standardized data from the central point set {C01, C02}, and choose standardized data having a largest distance from the central point set {C01, C02} as a third initial group central point C03; calculate a distance Di1 from C01, a distance Di2 from C02, and a distance Di3 from C03 separately of each piece of standardized data $Ui_{standard}$ in the standardized data except C01, C02, and C03, select the smallest value in Di1, Di2, and Di3 as a distance of $Ui_{standard}$ from a central point set {C01, C02, C03}, compare values of distances of the standardized data from the central point set {C01, C02, C03}, and choose standardized data having a largest distance from the central point set {C01, C02, C03} as a fourth initial group central point C04; perform a similar process until k initial group central points C01, C02, . . . , C0k are determined, where k is a preset total number of groups; calculate a distance of each piece of standardized data from each initial group central point, and place the standardized data in a group where an initial group central point having a shortest distance is located; separately calculate average values of the standardized data in the groups, and separately use the average values as k calibrated group central points C11, C12, . . . , C1k after a first iteration; calculate distances of each piece of standardized data from calibrated group central points after the first iteration, and place the standardized data in a group where a calibrated group central point having a shortest distance is located; separately calculate average values of the standardized data in the groups after the first iteration, and separately use the average values as k calibrated group central points C21, C22, . . . , C2k after a second iteration; perform a similar process until, after distances between calibrated group central points after a current iteration and corresponding calibrated group central points after a previous iteration are calculated, a sum of k distances is within a preset range, or until the number of iterations reaches a preset number of times, and use k calibrated group central points after the current iteration as the final group central points; and calculate distances of each piece of standardized data from the final group central points, and place the standardized data in a group where a final group central point having a shortest distance is located.

In this embodiment, grouping is performed by using a k-means clustering algorithm, where the group central points include initial group central points, calibrated group central points, and final group central points. First, any one of the group central points is acquired as a first initial group central point C01. Distances from C01 are separately calculated for rest data after the data that has been chosen as the first initial group central point C01 is removed from all the standardized data. A distance between two pieces of standardized data is calculated by using a Euclidean distance formula. For example, C01=U1=(X11, X21, . . . , Xj1, . . . , Xm1), and a distance between Ui=(X1i, X2i, . . . , Xji, . . . , Xmi) and C01 may be calculated by using the following formula:

$$Di = \sqrt{(X11-X1i)^2 + (X21-X2i)^2 + \ldots + (Xj1-Xji)^2 + \ldots + (Xm1-Xmi)^2}.$$

Standardized data with the largest Di value is standardized data having a longest distance away from C01, and is used as the second initial group central point C02.

During calculation of the third initial group central point C03, distances of the standardized data except C01 and C02 from the central point set {C01, C02} are calculated, and one piece of data standardized data having a longest distance from the central point set {C01, C02} is chosen as the third initial group central point C03. Subsequent initial group central points are calculated in a manner similar to that of calculating C03 until initial group central points of a preset number are found.

After initial group central points are determined, initial grouping is performed on the standardized data. A Euclidean distance formula is still used to calculate the distances from standardized data to the initial group central points, and place the standardized data in a group where an initial group central point having a shortest distance is located.

After initial grouping is completed, a manner of calculating average values of the groups is used to obtain calibrated values of group central points after one iteration, that is, calibrated group central points. During calculation of the average values, the average values are separately calculated by using standardized data of the statistical indicators in the groups. For example, a first group includes the following data:

$$U1=(X11,X21,\ldots,Xj1,\ldots,Xm1);$$

$$U3=(X13,X23,\ldots,Xj3,\ldots,Xm3);$$

$$U5=(X15,X22,\ldots,Xj5,\ldots,Xm5); \text{ and}$$

a first calibrated group central point after the first iteration is:

$$C11 = \left(\frac{X11+X13+X15}{3}, \frac{X21+X23+X25}{3}, \ldots, \frac{Xm1+Xm3+Xm5}{3}\right).$$

The standardized data is grouped again. A Euclidean distance formula is still used to calculate distances of the standardized data from the calibrated group central points, and the standardized data is placed in a group where a calibrated group central point having a shortest distance is located. After multiple iterations, calibrated group central points are calculated repeatedly and grouping is performed repeatedly, and iteration stops until calibrated group central points after multiple iterations do not change or change slightly or the preset number of iterations is reached. When it is determined that calibrated group central points of two consecutive iterations do not change or change slightly, the following manner may be used.

For example, the k calibrated group central points after the first iteration are C11, C12, . . . , C1k, and the k calibrated group central points after the second iteration are C21, C22, . . . , C2k;

distances between corresponding calibrated group central points of two consecutive iterations are calculated:

a distance D1 between C11 and C21, a distance D2 between C12 and C22, . . . , a distance Dk between C1k and C2k;

it may be separately determined whether D1, D2, . . . , Dk are within a preset range;

in addition, a sum of D1, D2, . . . , Dk may further be calculated to obtain a sum of distances Sum(D), and it is determined whether Sum(D) is within a preset range; and when D1, D2, ..., Dk are all within a preset range, or Sum(D) is within a preset range, it is considered that calibrated group central points of two consecutive iterations do not change or change slightly.

After the final group central points are obtained, the standardized data is placed again in a group where a final group central point having a shortest distance is located, so as to complete grouping.

In this embodiment, a k-means clustering algorithm is used to group users in a precise manner, so that formed groups are more accurate, and reasonable push of service information is facilitated.

Furthermore, the feature determination module 240 is configured to: separately calculate offset probabilities of the statistical indicators in the groups according to the standardized data in the groups, compare degrees of offset probabilities of a same statistical indicator in the groups, acquire a group whose offset probability of the statistical indicator has a clearest difference from those of other groups, and use a numerical value feature of the statistical indicator as a group feature of the group.

When a group feature is determined, degrees of offset probabilities of a same statistical indicator in the groups may be compared, one group having a clearest feature is found through comparison, and a numerical value feature of the statistical indicator is used as the group feature of the group. For example, the statistical indicator is the number of times of access. An offset probability of the number of times of access of a group 1 is much larger than those of other groups, and a numerical value feature of the number of times of access of the group 1 is that the number of times of access is large, and the numerical value feature is used as a group feature of the group 1. An offset probability of the number of times of access of a group 2 is much smaller than those of other groups, and a numerical value feature of the number of times of access of the group 2 is the number of times of access is small, and the numerical value feature is used as a group feature of the group 2. An offset probability may be calculated in multiple manners. For example, in one group, all standardized data of one statistical indicator is acquired, and an average value or a root mean square of the standardized data is calculated and used as an offset probability, and degrees of offset probabilities are then compared.

In this embodiment, offset probabilities of groups in statistical indicators are calculated to determine group features of the groups, and the formed groups have respective group features, so that service information is pushed according to the features of the groups, and information push becomes more reasonable.

Furthermore, the feature determination module 240 is further configured to calculate average values of statistical indicators of all standardized data:

$$Q0_{1\,standard}, Q0_{2\,standard}, \ldots, Q0_{j\,standard}, \ldots, Q0_{m\,standard};$$

$$Q0_{j\,standard} = (Xj_{1\,standard} + Xj_{2\,standard} + \cdots + Xj_{n\,standard})/n;$$

where $Q0_{j\,standard}$ is an average value of the jth statistical indicator in all the standardized data.

In finally determined groups, separately calculate average values Qt1standard, Qt2standard, ..., Qtjstandard, ..., Qtmstandard of the statistical indicators in the groups, where t is a group sequence number, $1 \le t \le k$, and Qtjstandard is an average value of the jth statistical indicator in a t-th group.

Separately calculate offset probabilities of the statistical indicators in the groups:

$$Pt_{1\,standard}, Pt_{2\,standard}, \ldots, Pt_{j\,standard}, \ldots, Pt_{m\,standard};$$

$$Pt_{j\,standard} = (Qt_{j\,standard} - Q0_{j\,standard})/Q0_{j\,standard};$$

where $Pt_{j\,standard}$ is an offset probability of the jth statistical indicator in the t-th group; and compare degrees of $P1_{j\,standard}, P2_{j\,standard}, \ldots, Pt_{j\,standard}, \ldots, Pk_{j\,standard}$, acquire the group whose offset probability in the jth statistical indicator has a clearest difference from those of the other groups, and use a numerical value feature of the jth statistical indicator as the group feature of the group.

When the foregoing manner is used to obtain offset probabilities of groups in a same statistical indicator, reference may be also made to the chart shown in FIG. 9. In the chart, an offset of a group 1 is the clearest, and has a large offset as compared with other groups, so that a numerical value feature of the statistical indicator is used as a group feature of the group 1, that is, the statistical indicator of the group 1 has a large offset. If offset probabilities of the groups in the statistical indicator do not have clear differences, the number of groups to form may be set again or attribute and/or behavior data of users may be selected again, and group central points are determined again and grouping is performed again. When the group central points are determined again, points same as those of a previous time may be selected as initial group central points, so that subsequent grouping is more stable. In addition, during calculation of an offset probability, use of standardized data may also be omitted, and a group feature of a group may also be obtained by directly using attribute and/or behavior data.

In this embodiment, offset probabilities of groups in statistical indicators are calculated to determine group features of the groups, and the formed groups have respective group features, so that service information is pushed according to the features of the groups, and information push becomes more reasonable.

Furthermore, the data statistics module 210 is further configured to acquire attribute and/or behavior data of users within a next period; the data conversion module 220 is further configured to convert the attribute and/or behavior data of the users within the next period into standardized data; the data grouping module 230 is further configured to place the standardized data of the users within the next period in a group where a group central point having a shortest distance is located; and the information push module 250 is further configured to push, according to group features of groups of the users within the next period, service push information of corresponding group features to the users within the next period.

In the foregoing embodiments, a fixed model of grouping is obtained, and within a subsequent period, attribute and/or behavior data of users only needs to be input in the fixed model to implement grouping of the users. Because the fixed model in the foregoing embodiment is used, within the subsequent period, grouping of users is more rapid and accurate, thereby making push of service information more reasonable, accurate, and convenient.

It should be noted that herein the terms "include", "comprise", and any variants thereof are intended to cover a non-exclusive inclusion. Therefore, in the context of a process, method, object, or device that includes a series of elements, the process, method, object, or device not only includes such elements, but also includes other elements not specified expressly, or may include inherent elements of the process, method, object, or device. Unless otherwise specified, an element limited by "include a/an . . . " does not exclude other same elements existing in the process, the method, the article, or the device that includes the element.

The sequence numbers of the above embodiments of the present invention are merely for the convenience of description, and do not imply the preference among the embodiments.

Through the above description of the implementation manners, it is clear to persons skilled in the art that the methods in the above embodiments may be accomplished through software plus a necessary Universal hardware platform or may certainly also be accomplished through hardware. However, in many cases, software plus a necessary Universal hardware platform is generally a preferred implementation manner. Based on this, the technical solution of the present disclosure or the part that makes contributions to the prior art can be substantially embodied in the form of a software product. The computer software product may be stored in a storage medium (for example, ROM/RAM, a magnetic disk or an optical disk), and contain several instructions to instruct a terminal device (for example, a mobile phone, a computer, a server, or a network device) to perform the method described in the embodiments of the present invention.

The foregoing descriptions are merely preferred embodiments of the present invention but are not intended to limit the patent scope of the present disclosure. Any equivalent modifications made to the structures or processes based on the content of the specification and the accompanying drawings of the present disclosure for direct or indirect use in other relevant technical fields shall also be encompassed in the patent protection scope of the present disclosure.

What is claimed is:

1. A method for grouping network service users, comprising:
   acquiring, by a processor, attribute and behavior data of multiple users within a current period, the attribute and behavior data of each user being stored in a memory and comprising multiple statistical indicators, and converting the attribute and behavior data into standardized data;
   determining, by the processor, multiple group central points according to the standardized data, and placing the standardized data in a group where a group central point having a shortest distance is located, wherein a distance between two pieces of the standardized data is calculated by using a Euclidean distance formula;
   determining, by the processor, group features of groups according to standardized data in the groups; and
   separately pushing, through a carrier network, service push information of corresponding group features to users in the groups according to the group features of the groups, wherein the determining group features of groups according to standardized data in the groups comprises: separately calculating, by the processor, offset probabilities of statistical indicators in the groups according to the standardized data in the groups, comparing, by the processor, degrees of offset probabilities of a same statistical indicator in the groups, acquiring, by the processor, a group whose offset probability of the statistical indicator has a clearest difference from those of other groups, and using a numerical value feature of the statistical indicator as a group feature of the group, so that formed groups have respective group features to push the service push information accordingly.

2. The method according to claim 1, the attribute and behavior data comprising:

$$U1 = (X11, X21, \ldots, Xj1, \ldots, Xm1);$$
$$U2 = (X12, X22, \ldots, Xj2, \ldots, Xm2);$$
$$\ldots;$$
$$Ui = (X1i, X2i, \ldots, Xji, \ldots, Xmi);$$
$$\ldots;$$
$$Un = (X1n, X2n, \ldots, Xjn, \ldots, Xmn);$$

wherein i is a sequence number of a user, n is an acquired total number of users, Ui is attribute and behavior data of an ith user, j is a sequence number of a statistical indicator of attribute and behavior data, m is a total number of statistical indicators of attribute and behavior data, Xj is attribute and behavior data of a jth statistical indicator, and Xji is attribute and behavior data of the jth statistical indicator of the ith user.

3. The method according to claim 2, wherein when the attribute and behavior data is consecutive-type data, the attribute and behavior data into standardized data is converted by using the following formulas:

$$Xji_{standard} = (Xji - Xj\min)/(Xj\max - Xj\min);$$

$$Ui_{standard} = (X1i_{standard}, X2i_{standard}, \ldots, Xji_{standard}, \ldots, Xmi_{standard});$$

wherein $Xji_{standard}$ is standardized data after conversion of Xji, Xjmax is attribute and behavior data having a largest numerical value in all attribute and behavior data of the jth statistical indicator within the current period, and Xjmin is attribute and behavior data having a smallest numerical value in all attribute and behavior data of the jth statistical indicator within the current period.

4. The method according to claim 3, wherein the step of the separately calculating offset probabilities of statistical indicators in the groups according to the standardized data in the groups, comparing degrees of offset probabilities of a same statistical indicator in the groups, acquiring a group whose offset probability of the statistical indicator has a clearest difference from those of other groups, and using a numerical value feature of the statistical indicator as a group feature of the group comprises:
   calculating average values of statistical indicators of all standardized data:

$$Q01_{standard}, Q02_{standard}, \ldots, Q0j_{standard}, \ldots, Q0m_{standard};$$

$$Q0j_{standard} = (Xj1_{standard} + Xj2_{standard} + \ldots + Xjn_{standard})/n;$$

wherein $Q0j_{standard}$ is an average value of the jth statistical indicator in all the standardized data;
   in finally determined groups, separately calculating average values $Qt1_{standard}, Qt2_{standard}, \ldots, Qtj_{standard}, \ldots, Qtm_{standard}$ of the statistical indicators in the groups, wherein t is a group sequence number, $1 \le t \le k$, and $Qtj_{standard}$ is an average value of the jth statistical indicator in a t-th group;
   separately calculating offset probabilities of the statistical indicators in the groups:

$$Pt1_{standard}, Pt2_{standard}, \ldots, Ptj_{standard}, \ldots, Ptm_{standard};$$

$$Ptj_{standard} = (Qtj_{standard} - Q0j_{standard})/Q0j_{standard};$$

wherein Ptj$_{standard}$ is an offset probability of the jth statistical indicator in the t-th group; and comparing degrees of P1j$_{standard}$, P2j$_{standard}$, . . . , Ptj$_{standard}$, . . . , Pkj$_{standard}$, acquiring the group whose offset probability in the jth statistical indicator has a clearest difference from those of the other groups, and using a numerical value feature of the jth statistical indicator as the group feature of the group.

5. The method according to claim 2, wherein when the attribute and behavior data is category-type data, the converting the attribute and behavior data into standardized data comprises:

categorizing values of attribute and behavior data in a same statistical indicator, and categorizing same values into one type, values after categorization comprising Y1, Y2, . . . , Ye, . . . , Yf, wherein f is a total number of value categories, e is a category sequence number of a value, and Ye is an eth type value;

determining whether f is smaller than or equal to 2;

determining, when f is smaller than or equal to 2, whether Y1 and Y2 are only 0 or 1;

skipping, if Y1 and Y2 are only 0 or 1, numerical value conversion, and using the original attribute and behavior data as standardized data Xji;

converting, if Y1 and Y2 are not only 0 or 1, Y1 into 0, and converting Y2 into 1, or converting Y1 into 1, and converting Y2 into 0, and using the data after conversion as standardized data Xji; and taking, when f is greater than 2, if a value of the attribute and behavior data is Ye, the value corresponding to Ye as 1, taking values other than Ye as 0, converting, in an arrangement order of Y1, Y2, . . . , Ye, . . . , Yf, the values of the attribute and behavior data into f-digit binary type data, and multiplying the binary type data after conversion by $1/\sqrt{2}$, to obtain standardized data Xji$_{standard}$.

6. The method according to claim 1, wherein the group central points comprise initial group central points, calibrated group central points, and final group central points; and the determining multiple group central points according to the standardized data, and placing the standardized data in a group where a group central point having a shortest distance is located comprises:

acquiring any piece from all standardized data as a first initial group central point C01;

searching the standardized data except C01 for standardized data having a longest distance away from C01, and using the standardized data having the longest distance away from C01 as a second initial group central point C02;

calculating a distance Di1 from C01 and a distance Di2 from C02 separately of each piece of standardized data Ui$_{standard}$ in the standardized data except C01 and C02, selecting the smaller value in Di1 and Di2 as a distance of Ui$_{standard}$ from a central point set {C01, C02}, comparing values of distances of the standardized data from the central point set {C01, C02}, and choosing standardized data having a largest distance from the central point set {C01, C02} as a third initial group central point C03;

calculating a distance Di1 from C01, a distance Di2 from C02, and a distance Di3 from C03 separately of each piece of standardized data Ui$_{standard}$ in the standardized data except C01, C02, and C03, selecting the smallest value in Di1, Di2, and Di3 as a distance of Ui$_{standard}$ from a central point set {C01, C02, C03}, comparing values of distances of the standardized data from the central point set {C01, C02, C03}, and choosing standardized data having a largest distance from the central point set {C01, C02, C03} as a fourth initial group central point C04; and performing a similar calculation process until k initial group central points C01, C02, . . . , C0k are determined, wherein k is a preset total number of groups.

7. The method according to claim 6, wherein the group central points comprise initial group central points, calibrated group central points, and final group central points; and the determining multiple group central points according to the standardized data, and placing the standardized data in a group where a group central point having a shortest distance is located, further comprises:

calculating a distance of each piece of standardized data from each initial group central point, and placing the standardized data in a group where an initial group central point having a shortest distance is located;

separately calculating average values of the standardized data in the groups, and separately using the average values as k calibrated group central points C11, C12, . . . , C1k after a first iteration;

calculating distances of each piece of standardized data from calibrated group central points after the first iteration, and placing the standardized data in a group where a calibrated group central point having a shortest distance is located;

separately calculating average values of the standardized data in the groups after the first iteration, and separately using the average values as k calibrated group central points C21, C22, . . . , C2k after a second iteration; and performing a similar calculation process until, after distances between calibrated group central points after a current iteration and corresponding calibrated group central points after a previous iteration are calculated, a sum of k distances is within a preset range, or until the number of iterations reaches a preset number of times, and using k calibrated group central points after the current iteration as the final group central points.

8. The method according to claim 7, wherein the group central points comprise initial group central points, calibrated group central points, and final group central points; and the determining multiple group central points according to the standardized data, and placing the standardized data in a group where a group central point having a shortest distance is located, further comprises:

calculating distances of each piece of standardized data from the final group central points, and placing the standardized data in a group where a final group central point having a shortest distance is located.

9. The method according to claim 6, wherein a distance between the two pieces of standardized data is a Euclidean distance.

10. The method according to claim 1, after the step of the separately pushing service push information of corresponding group features to users in the groups according to the group features of the groups, further comprising:

acquiring attribute and behavior data of users within a next period, and converting the attribute and behavior data of the users within the next period into standardized data;

placing the standardized data of the users within the next period in a group where a group central point having a shortest distance is located; and pushing, according to group features of groups of the users within the next period, service push information of corresponding group features to the users within the next period.

11. An apparatus for grouping network service users, comprising:
a memory;
a processor coupled to the memory;
a plurality of program modules stored in the memory to be executed by the processor, the plurality of program modules comprising:
    a data statistics module, configured to acquire attribute and behavior data of multiple users within a current period, the attribute and behavior data of each user comprising multiple statistical indicators;
    a data conversion module, configured to convert the attribute and behavior data into standardized data;
    a data grouping module, configured to determine multiple group central points according to the standardized data, and place the standardized data in a group where a group central point having a shortest distance is located, wherein a distance between two pieces of the standardized data is calculated by using a Euclidean distance formula;
    a feature determination module, configured to determine group features of groups according to standardized data in the groups; and
    an information push module, configured to separately push service push information of corresponding group features to users in the groups according to the group features of the groups, wherein the feature determination module is configured to: separately calculate offset probabilities of statistical indicators in the groups according to the standardized data in the groups, compare degrees of offset probabilities of a same statistical indicator in the groups, acquire a group whose offset probability of the statistical indicator has a clearest difference from those of other groups, and use a numerical value feature of the statistical indicator as a group feature of the group, so that formed groups have respective group features to push the service push information accordingly.

12. The apparatus according to claim 11, wherein the attribute and behavior data acquired by the data statistics module comprises:

$$U1 = (X11, X21, \ldots, Xj1, \ldots, Xm1);$$
$$U2 = (X12, X22, \ldots, Xj2, \ldots, Xm2);$$
$$\ldots;$$
$$Ui = (X1i, X2i, \ldots, Xji, \ldots, Xmi);$$
$$\ldots;$$
$$Un = (X1n, X2n, \ldots, Xjn, \ldots, Xmn);$$

wherein i is a sequence number of a user, n is an acquired total number of users, Ui is attribute and behavior data of an ith user, j is a sequence number of a statistical indicator of attribute and behavior data, m is a total number of statistical indicators of attribute and behavior data, Xj is attribute and behavior data of a jth statistical indicator, and Xji is attribute and behavior data of the jth statistical indicator of the ith user.

13. The apparatus according to claim 12, wherein when the attribute and behavior data is consecutive-type data, the data conversion module converts the attribute and behavior data into the standardized data by using the following formulas:

$$Xji_{standard} = (Xji - Xj\min)/(Xj\max - Xj\min);$$

$$Ui_{standard} = (X1i_{standard}, X2i_{standard}, \ldots, Xji_{standard}, \ldots, Xmi_{standard});$$

wherein $Xji_{standard}$ is standardized data after conversion of Xji, Xjmax is attribute and behavior data having a largest numerical value in all attribute and behavior data of the jth statistical indicator within the current period, and Xjmin is attribute and behavior data having a smallest numerical value in all attribute and behavior data of the jth statistical indicator within the current period.

14. The apparatus according to claim 12, wherein when the attribute and behavior data is category-type data, the data conversion module converts the attribute and behavior data into the standardized data in the following manner:
    categorizing values of attribute and behavior data in a same statistical indicator, and categorizing same values into one type, values after categorization comprising Y1, Y2, . . . , Ye, . . . , Yf, wherein f is a total number of value categories, e is a category sequence number of a value, and Ye is an eth type value;
    determining whether f is smaller than or equal to 2;
    determining, when f is smaller than or equal to 2, whether Y1 and Y2 are only 0 or 1;
    skipping, if yes, numerical value conversion, and using the original attribute and behavior data as standardized data Xji;
    converting if not, Y1 into 0, and converting Y2 into 1, or converting Y1 into 1, and converting Y2 into 0, and using the data after conversion as standardized data Xji; and
    taking, when f is greater than 2, if a value of the attribute and behavior data is Ye, the value corresponding to Ye as 1, taking values other than Ye as 0, converting, in an arrangement order of Y1, Y2, . . . , Ye, . . . , Yf, the values of the attribute and behavior data into f-digit binary type data, and multiplying the binary type data after conversion by $1/\sqrt{2}$, to obtain standardized data $Xji_{standard}$.

15. The apparatus according to claim 11, wherein the group central points comprise initial group central points, calibrated group central points, and final group central points, and the data grouping module is further configured to:
    acquire any piece from all standardized data as a first initial group central point C01;
    search the standardized data except C01 for standardized data having a longest distance away from C01, and use the standardized data having the longest distance away from C01 as a second initial group central point C02;
    calculate a distance Di1 from C01 and a distance Di2 from C02 separately of each piece of standardized data $Ui_{standard}$ in the standardized data except C01 and C02, select the smaller value in Di1 and Di2 as a distance of $Ui_{standard}$ from a central point set {C01, C02}, compare values of distances of the standardized data from the central point set {C01, C02}, and choose standardized data having a largest distance from the central point set {C01, C02} as a third initial group central point C03;
    calculate a distance Di1 from C01, a distance Di2 from C02, and a distance Di3 from C03 separately of each piece of standardized data $Ui_{standard}$ in the standardized data except C01, C02, and C03, select the smallest value in Di1, Di2, and Di3 as a distance of $Ui_{standard}$ from a central point set {C01, C02, C03}, compare values of distances of the standardized data from the central point set {C01, C02, C03}, and choose standardized data having a largest distance from the central point set {C01, C02, C03} as a fourth initial group central point C04;

perform a similar calculation process until k initial group central points C01, C02, . . . , C0k are determined, wherein k is a preset total number of groups.

16. The apparatus according to claim 15, wherein the data grouping module is further configured to:

calculate a distance of each piece of standardized data from each initial group central point, and place the standardized data in a group where an initial group central point having a shortest distance is located;

separately calculate average values of the standardized data in the groups, and separately use the average values as k calibrated group central points C11, C12, . . . , C1k after a first iteration;

calculate distances of each piece of standardized data from calibrated group central points after the first iteration, and place the standardized data in a group where a calibrated group central point having a shortest distance is located;

separately calculate average values of the standardized data in the groups after the first iteration, and separately use the average values as k calibrated group central points C21, C22, . . . , C2k after a second iteration; and perform a similar calculation process until, after distances between calibrated group central points after a current iteration and corresponding calibrated group central points after a previous iteration are calculated, a sum of k distances is within a preset range, or until the number of iterations reaches a preset number of times, and use k calibrated group central points after the current iteration as the final group central points.

17. The apparatus according to claim 16, wherein the data grouping module is further configured to:

calculate distances of each piece of standardized data from the final group central points, and place the standardized data in a group where a final group central point having a shortest distance is located.

18. The apparatus according to claim 15, wherein a distance between the two pieces of standardized data is a Euclidean distance.

19. The apparatus according to claim 11, wherein the feature determination module is further configured to:

calculate average values of statistical indicators of all standardized data:

$$Q01_{standard}, Q02_{standard}, \ldots, Q0j_{standard}, \ldots, Q0m_{standard};$$

$$Q0j_{standard} = (Xj1_{standard} + Xj2_{standard} + \ldots + Xjn_{standard})/n;$$

wherein $Q0j_{standard}$ is an average value of the jth statistical indicator in all the standardized data;

in finally determined groups, separately calculate average values $Qt1_{standard}$, $Qt2_{standard}$, . . . , $Qtj_{standard}$, . . . , $Qtm_{standard}$ of the statistical indicators in the groups, wherein t is a group sequence number, $1 \leq t \leq k$, and $Qtj_{standard}$ is an average value of the jth statistical indicator in a t-th group;

separately calculate offset probabilities of the statistical indicators in the groups:

$$Pt1_{standard}, Pt2_{standard}, \ldots, Ptj_{standard}, \ldots, Ptm_{standard};$$

$$Ptj_{standard} = (Qtj_{standard} - Q0j_{standard})/Q0j_{standard};$$

wherein $Ptj_{standard}$ is an offset probability of the jth statistical indicator in the t-th group; and compare degrees of $P1j_{standard}$, $P2j_{standard}$, . . . , $Ptj_{standard}$, . . . , $Pkj_{standard}$, acquire the group whose offset probability in the jth statistical indicator has a clearest difference from those of the other groups, and use a numerical value feature of the jth statistical indicator as the group feature of the group.

20. The apparatus according to claim 11, wherein the data statistics module is further configured to acquire attribute and behavior data of users within a next period;

the data conversion module is further configured to convert the attribute and behavior data of the users within the next period into standardized data;

the data grouping module is further configured to place the standardized data of the users within the next period in a group where a group central point having a shortest distance is located; and the information push module is further configured to push, according to group features of groups of the users within the next period, service push information of corresponding group features to the users within the next period.

* * * * *